United States Patent
Chalamalasetty et al.

(10) Patent No.: US 12,321,765 B2
(45) Date of Patent: Jun. 3, 2025

(54) SYSTEM AND METHOD FOR PROVIDING ON-DEMAND LOCALIZATION IN A MICROSERVICE APPLICATION ENVIRONMENT

(71) Applicant: Oracle International Corporation, Redwood Shores, CA (US)

(72) Inventors: Vamsi Chalamalasetty, Hyderabad (IN); Manish Kumar, Hyderabad (IN); Adya Kiran, Hyderabad (IN); Javed Akhtar, Hyderabad (IN); Venugopal Machiraju, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/534,972

(22) Filed: Nov. 24, 2021

(65) Prior Publication Data

US 2023/0137876 A1      May 4, 2023

Related U.S. Application Data

(60) Provisional application No. 63/275,836, filed on Nov. 4, 2021.

(51) Int. Cl.
*G06F 9/451* (2018.01)
*G06F 3/0484* (2022.01)
*G06F 9/54* (2006.01)

(52) U.S. Cl.
CPC ............ *G06F 9/454* (2018.02); *G06F 3/0484* (2013.01); *G06F 9/543* (2013.01)

(58) Field of Classification Search
CPC ........ G06F 9/454; G06F 3/0484; G06F 9/543; G06F 3/0481
See application file for complete search history.

(56) References Cited

U.S. PATENT DOCUMENTS

| | | | |
|---|---|---|---|
| 8,930,576 B1 * | 1/2015 | Roberts ............ | H04N 21/25875 704/E15.001 |
| 9,104,661 B1 * | 8/2015 | Evans ..................... | G06F 40/58 |
| 10,331,394 B1 * | 6/2019 | Sarfi ..................... | G06F 3/1423 |
| 10,816,949 B1 * | 10/2020 | Kohn ................... | G05B 19/056 |

(Continued)

OTHER PUBLICATIONS

Unknown, "Singleton in VMware—Singleton", retrieved on Oct. 6, 2021; Last update on Sep. 24, 2019 ; 3 pages, retrieved from: <https://vmware.github.io/singleton>.

*Primary Examiner* — Kenny Nguyen
(74) *Attorney, Agent, or Firm* — TUCKER ELLIS LLP (57) ABSTRACT

In accordance with an embodiment, described herein is a system and method for providing on-demand localization in a microservice application environment. Generally described, an on-demand localization environment enables the system to serve localized user interface labels for an existing, e.g., monolith application, on-demand-without impacting the existing setup of the application or its present means of handling localizations. The described approach can ensure that only the localization which is needed for a particular user interface or visited page is served, without incurring additional round-trips back to the server for user interface messages that could have been served from the client. For applications and user interfaces comprising more than one module, the system can retrieve the localization for each of the modules in a single call.

18 Claims, 9 Drawing Sheets

(56) References Cited

U.S. PATENT DOCUMENTS

| | | | |
|---|---|---|---|
| 11,010,020 B2* | 5/2021 | Li | G06F 3/04817 |
| 11,269,917 B1* | 3/2022 | Srikantan | G06F 11/1662 |
| 2011/0314405 A1* | 12/2011 | Turner | G06F 3/0238 |
| | | | 715/773 |
| 2013/0050135 A1* | 2/2013 | Stewart | G06F 3/0219 |
| | | | 345/173 |
| 2013/0321277 A1* | 12/2013 | Ha | H01H 9/181 |
| | | | 345/168 |
| 2015/0033319 A1* | 1/2015 | Roberts | H04L 63/0272 |
| | | | 726/11 |
| 2015/0039287 A1* | 2/2015 | Han | G06F 40/58 |
| | | | 704/2 |
| 2016/0055611 A1* | 2/2016 | Manevitch | G06T 1/20 |
| | | | 345/501 |
| 2018/0004544 A1* | 1/2018 | Vasiltschenko | G06F 9/454 |
| 2019/0102230 A1* | 4/2019 | Buckley | G06F 9/30036 |
| 2019/0196774 A1* | 6/2019 | Sarfi | H04L 67/025 |
| 2021/0232273 A1* | 7/2021 | Gupta | G06F 3/0482 |

* cited by examiner

SYSTEM AND METHOD FOR PROVIDING ON-DEMAND LOCALIZATION IN A MICROSERVICE APPLICATION ENVIRONMENT

CLAIM OF PRIORITY

This application claims the benefit of priority to U.S. Provisional Application titled "SYSTEM AND METHOD FOR PROVIDING ON-DEMAND LOCALIZATION IN A MICROSERVICE APPLICATION ENVIRONMENT", Application No. 63/275,836, filed Nov. 4, 2021; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to cloud computing, enterprise applications, and microservices, and are particularly directed to a system and method for providing on-demand localization in a microservice application environment.

BACKGROUND

Today's enterprise software applications are increasingly used globally, serving large numbers of users distributed across many geographic regions. It has become a common requirement for such applications to be able to display a user interface in the user's local language.

In a complex single-page application, having a user interface displayable within a browser, each of the pages displayed within the user interface may actually be composed by responses from multiple services or microservices. In order to display the user interface in the user's local language, each displayed page may require retrieving locale-specific information from all of the services it is comprised of—leading to multiple network calls.

Even if locale-specific bundles are hosted at one microservice to reduce the need for multiple network calls—with the increasing number of application features, the locale-specific bundles can grow in size exponentially, which can be unwieldy and difficult to maintain. Attempting to load such a large bundle onto the client browser can consume large amounts of bandwidth and browser memory, leading to system performance issues.

SUMMARY

In accordance with an embodiment, described herein is a system and method for providing on-demand localization in a microservice application environment. Generally described, an on-demand localization environment enables the system to serve localized user interface labels for an existing, e.g., monolith application, on-demand-without impacting the existing setup of the application or its present means of handling localizations. The described approach can ensure that only the localization which is needed for a particular user interface or visited page is served, without incurring additional round-trips back to the server for user interface messages that could have been served from the client. For applications and user interfaces comprising more than one module, the system can retrieve the localization for each of the modules in a single call.

DETAILED DESCRIPTION

In accordance with an embodiment, described herein is a system and method for providing on-demand localization in a microservice application environment.

Generally described, an on-demand localization environment enables the system to serve localized user interface labels for an existing, e.g., monolith application, on-demand-without impacting the existing setup of the application or its present means of handling localizations.

The described approach can ensure that only the localization which is needed for a particular user interface or visited page is served, without incurring additional round-trips back to the server for user interface messages that could have been served from the client. For applications and user interfaces comprising more than one module, the system can retrieve the localization for each of the modules in a single call.

Figure 1:
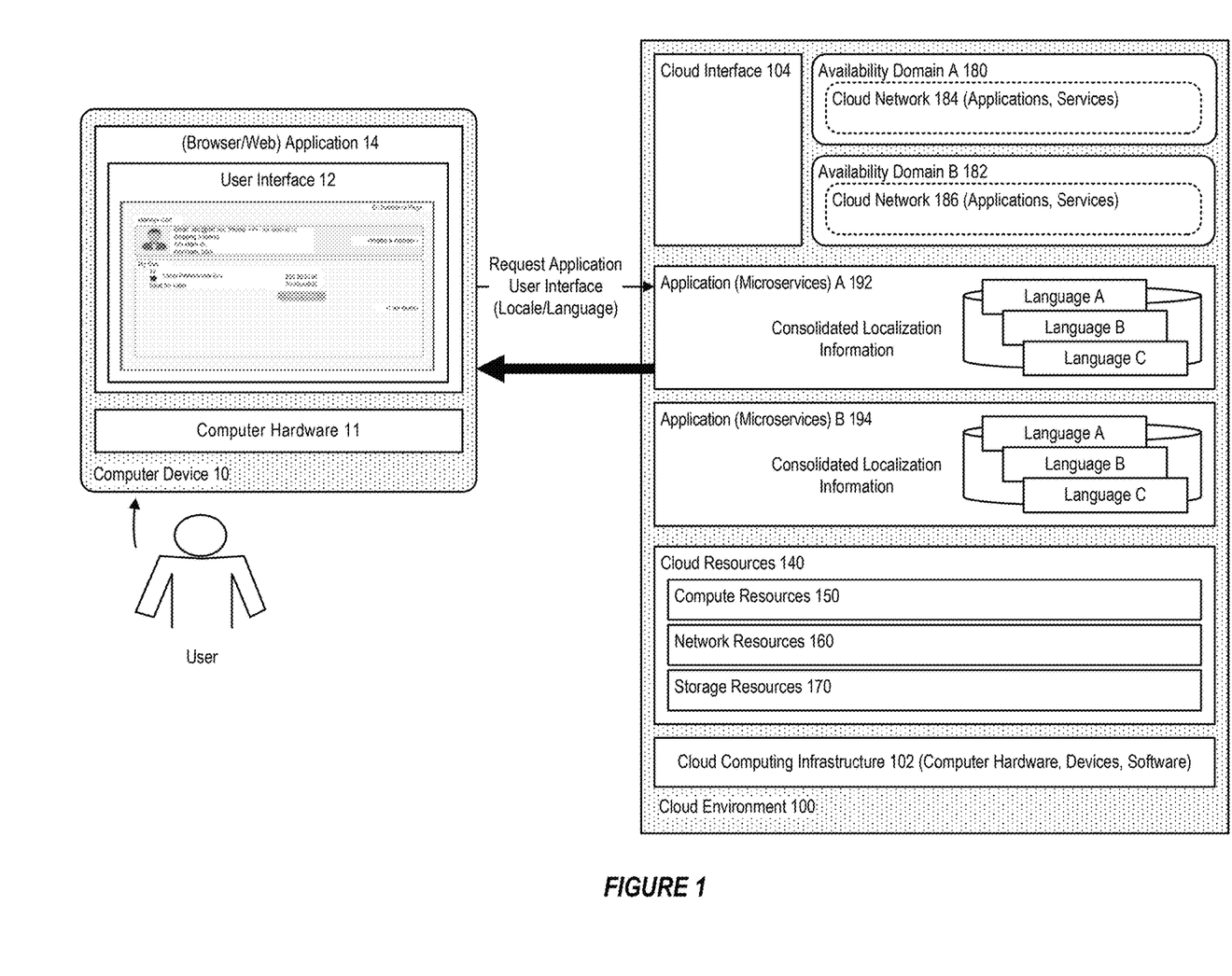
FIG. 1 illustrates an example of a computing environment that provides applications and allows access via a user interface, in accordance with an embodiment.

FIG. 1 illustrates an example of a computing environment that provides applications and allows access via a user interface, in accordance with an embodiment.

In accordance with an embodiment, the components and processes illustrated in FIG. 1, and as further described herein with regard to various embodiments, can be provided as software or program code executable by a computer system or other type of processing device, for example a cloud computing system.

The illustrated example is provided for purposes of illustrating a computing environment that can utilize on-demand localization; in accordance with other embodiments, the various components, processes, and on-demand localization features described herein can be used with other types of computing environments.

As illustrated in FIG. 1, in accordance with an embodiment, a computing environment (e.g., cloud environment) 100 can operate on a computing infrastructure 102 comprising hardware (e.g., processor, memory), software resources, and one or more cloud interfaces 104 or other application program interfaces (API) that provide access to the shared cloud resources.

In accordance with an embodiment, the computing environment provides access to shared cloud resources 140 via, for example, a compute resources layer 150, a network resources layer 160, and/or a storage resources layer 170. In accordance with an embodiment, the compute resources layer can comprise resources, such as, for example, virtual machines, compute cloud instances and/or containers; and can be used to, for example, provision cloud instances as needed to deploy and run applications.

In accordance with an embodiment, the network resources layer can comprise network-related resources, such as, for example, virtual cloud networks, edge services, and/or connection services; while the storage resources layer can comprise, for example, data/block volumes, file storage, object storage, and/or local storage.

In accordance with an embodiment, the computing environment supports the use of availability domains, such as for example availability domains A 180, B 182, which enables customers to create and access cloud networks 184, 186, and run cloud instances.

In accordance with an embodiment, a client device, such as, for example, a computing device 10 having a device hardware 11 (e.g., processor, memory), a client application 14 (e.g., browser/web client), and graphical user interface 12, can enable a user to communicate with the cloud computing environment via a network such as, for example, a wide area network, local area network, or the Internet, to access various applications, e.g., enterprise applications.

In accordance with an embodiment, the system supports the use of one or more monolith applications A 192, B 194, for example an enterprise application or other application for which localization can be provided.

Application Localization

Figure 2:
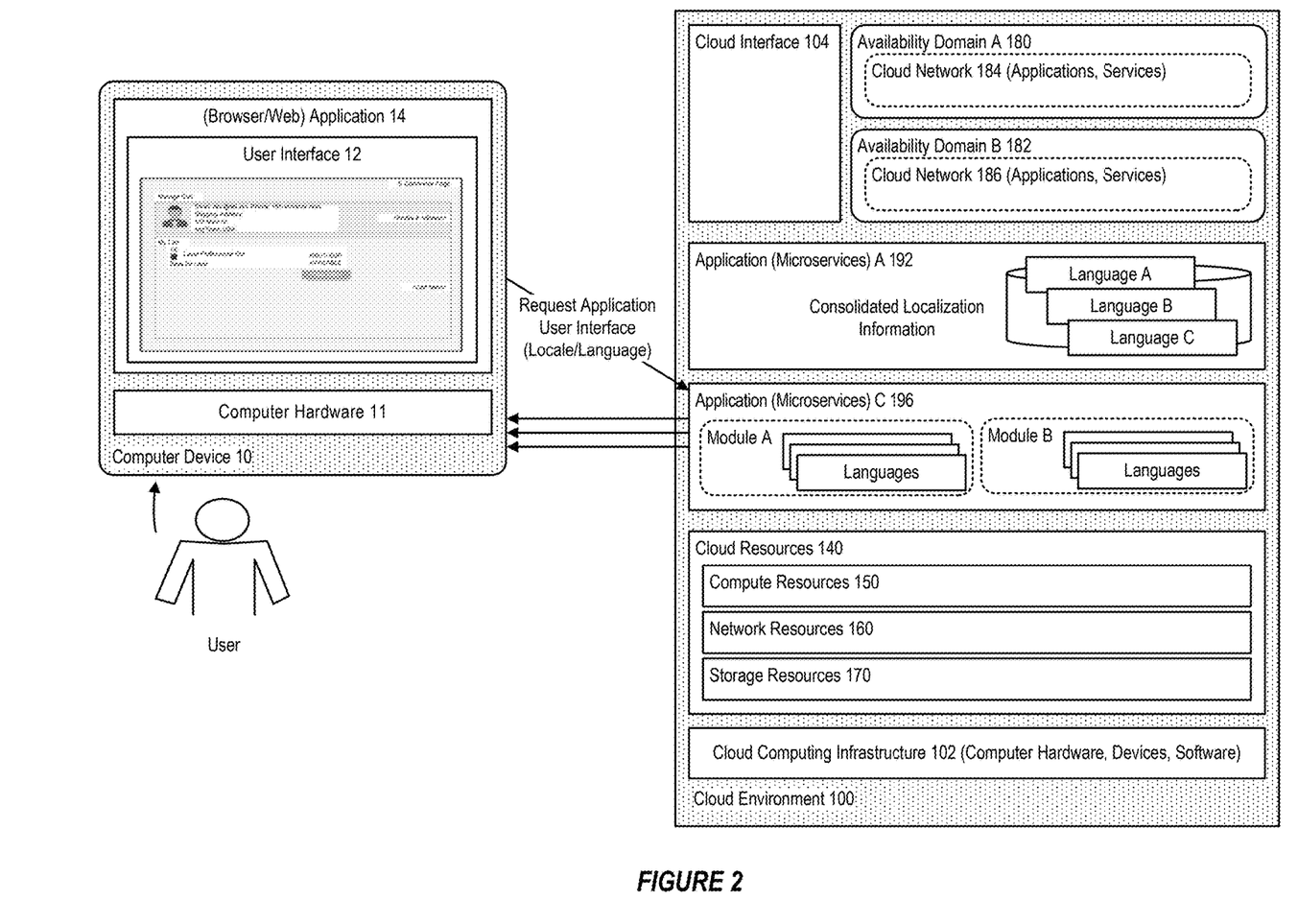
FIG. 2 further illustrates an example of a cloud environment that provides applications and allows access via a user interface, in accordance with an embodiment.
Figure 3:
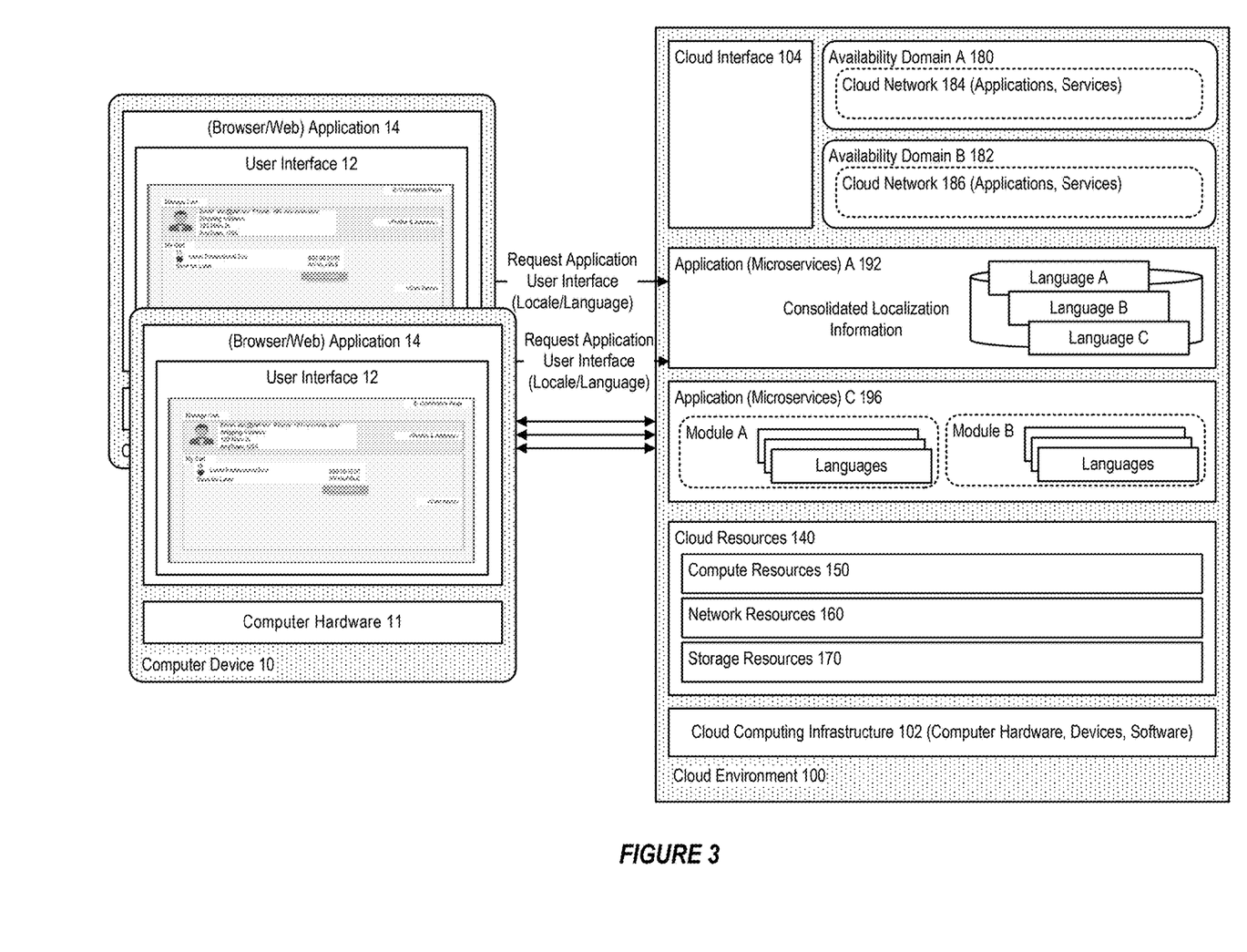
FIG. 3 further illustrates an example of a cloud environment that provides applications and allows access via a user interface, in accordance with an embodiment.

FIGS. 2-3 further illustrate an example of a cloud environment that provides applications and allows access via a user interface, in accordance with an embodiment.

As described above, with today's enterprise software applications increasingly used globally, serving large numbers of users distributed across many geographic regions, it has become a common requirement for such applications to be able to display a user interface in the user's local language.

In a complex single-page application, having a user interface displayable within a browser, each of the pages displayed within the user interface may actually be composed by responses from multiple services or microservices. In order to display the user interface in the user's local language, each displayed page may require retrieving locale-specific information from all of the services it is comprised of—leading to multiple network calls.

One approach to address this is to employ locale-specific bundles (e.g., an xliff/properties file) with key and values on the server-side. Migrating a legacy application to a modern single-page application user interface can be challenging without a means of providing page labels needed for the client locale in a modularized fashion.

For example, as illustrated in FIG. 2, each monolith application may have all possible localizations in one single file. So assuming support is provided for fifteen languages, then there will be fifteen versions of the localization file for each language.

As illustrated in the example of FIG. 3, as an alternative to including all possible localizations in one single file, one could consider partitioning the localization file for an application C 196 per module. However, an enterprise application may have 10+ or more modules; which results in about 150 (15×10) files; and this may have its own overhead for developers, build teams, and translations teams. Partitioning the localization file also brings in the challenge of common labels used across modules, which may get re-defined at multiple modules.

Additionally, at runtime, depending on the type of technology used (e.g., JSF, or Client Side Framework) the system may be serving more localized labels than needed; with round-trips back to server as needed to serve messages that are not embedded in the user interface, for example a user trying to delete an artifact. For example, with JSF, a call has to go back to fetch this message; which results in either pushing more localization to each page, or making more trips back to the server.

On-Demand Localization

In accordance with an embodiment, described herein is a system and method for providing on-demand localization in a microservice application environment.

Generally described, an on-demand localization environment enables the system to serve localized user interface labels for an existing, e.g., monolith application, on-demand-without impacting the existing setup of the application or its present means of handling localizations.

The described approach can ensure that only the localization which is needed for a particular user interface or visited page is served, without incurring additional round-trips back to the server for user interface messages that could have been served from the client. For applications and user interfaces comprising more than one module, the system can retrieve the localization for each of the modules in a single call.

In accordance with an embodiment, the system supports the use of a centralized REST API, that operates to receive a request at an endpoint associated with an application's user interface or page that includes a locale, e.g., language, identification and requested/visited page information in its URI. The REST API can use the locale or language and page information to review an internally-configured JSON metadata file for the requested page.

In accordance with an embodiment, the metadata file provides a configuration indicating which labels (keys) are needed by the requested page, and which internal microservice to retrieve those labels from, in the corresponding localization, e.g., language, required by the user.

In accordance with an embodiment, the REST API can then orchestrate asynchronous calls to the underlying microservices to fetch the locale-specific labels for each of the page labels associated with the requested page. The response from each of the underlying microservices is aggregated, and the aggregated labels returned to the user's client application (e.g., browser), so that the page elements can be rendered in the required localization, e.g., language.

Figure 4:
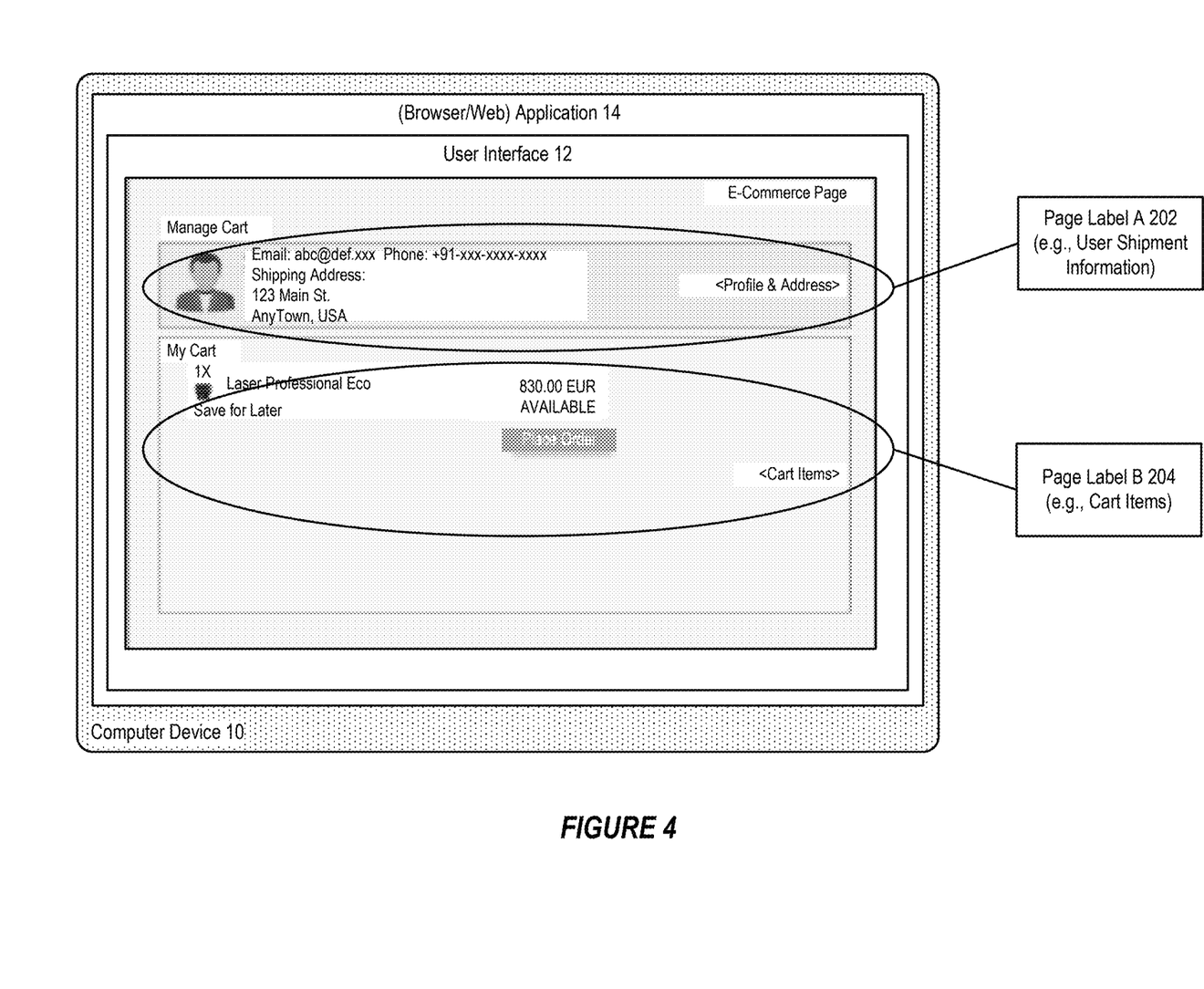
FIG. 4 illustrates the use of page labels in providing on-demand localization with a microservice application, in accordance with an embodiment.

FIG. 4 illustrates the use of page labels in providing on-demand localization with a microservice application, in accordance with an embodiment.

As illustrated in FIG. 4, by way of example, a user interface for an application can include, in this example, an e-commerce manager shopping cart page, having a pair of page elements including user shipment information and cart items on the same page, each of which page elements can be associate with a page label A 202 and page label B 204 respectively.

Depending on the particular application, each of these labels may be managed under different microservices on the server side. For the client-side technology to render the labels in user's locale it can perform any of the following: have a single large translation bundle for the entire application loaded onto the browser at login; which will incur lot of bandwidth consumption and labels are served to the client more than what is needed; or alternatively, make an 'n' number of REST API calls to fetch label information when a particular page is visited. The number of API calls depends upon the number of modules/services loaded on a page, which incurs more number of roundtrips to the server.

Figure 5:
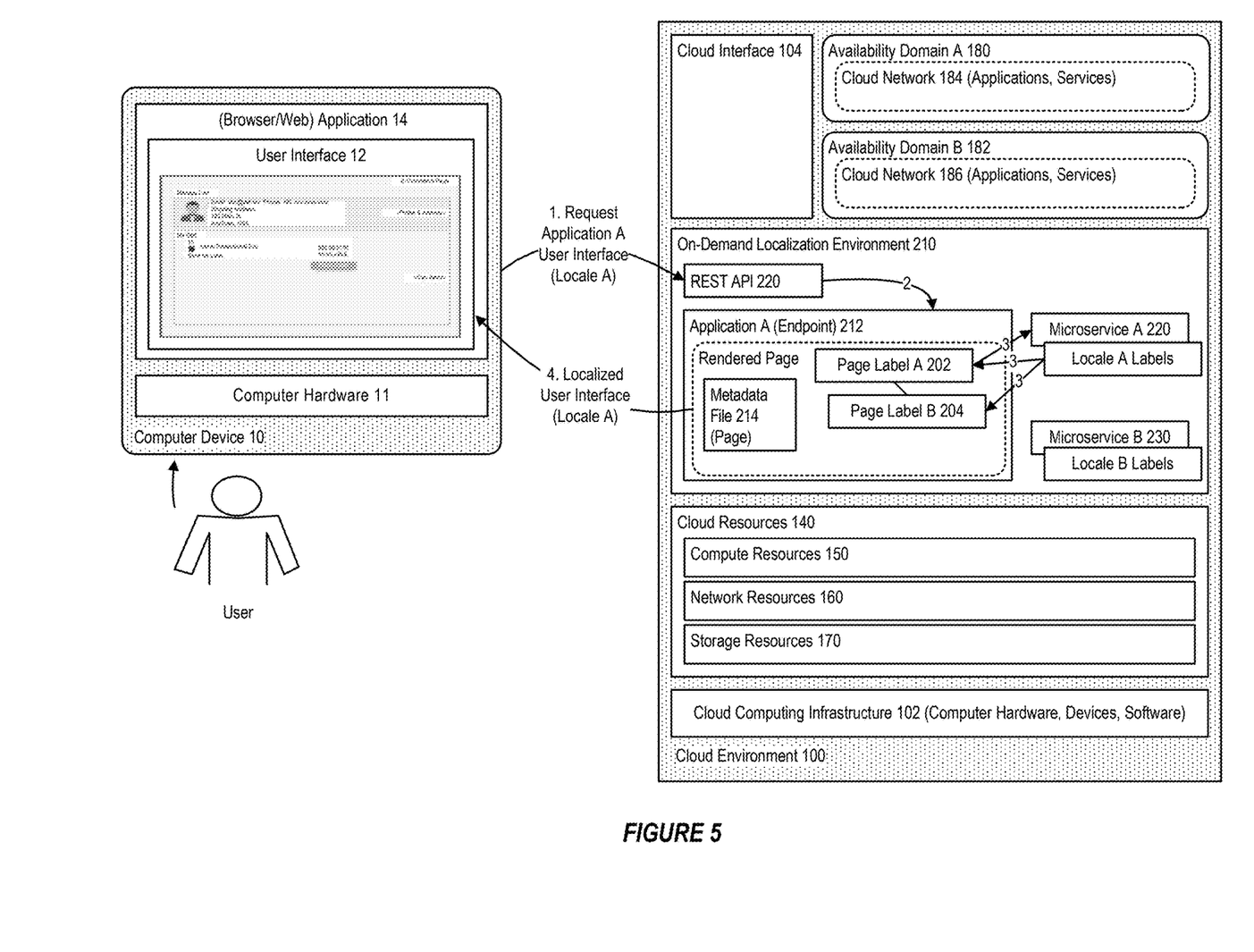
FIG. 5 illustrates a system for providing on-demand localization with a microservice application, in accordance with an embodiment.

FIG. 5 illustrates a system for providing on-demand localization with a microservice application, in accordance with an embodiment.

As illustrated in FIG. 5, in accordance with an embodiment, in accordance with an embodiment, an on-demand localization environment 210 enables the system to serve localized user interface labels or label values for an existing (e.g., monolith) application, for example an enterprise application, on-demand-without an impact on any existing setup of the application or its means of handling localizations.

In accordance with an embodiment, the system supports the use of a centralized REST API 220, that operates to receive a request at an application endpoint 212 associated with an application's user interface or page that includes a locale, e.g., language, identification and requested/visited page information in its URI-such as, for example, a user's preferred language code (e.g., "en" for English language'); and the currently-requested or visited page represented in a hierarchical format (e.g., shoppingapp.pages.manage-cart).

In accordance with an embodiment, the REST API can use the locale or language and page information to review an internally-configured JSON metadata file 214 for the requested page.

In accordance with an embodiment, the metadata file can be configured in a JSON path format, with a same hierarchy as the requested page (e.g., /shoppingapp/pages/manage-cart). The metadata file provides a configuration indicating which labels (keys) are needed by the requested page, and which internal microservice to retrieve those labels from, in the corresponding localization, e.g., language, required by the user.

In accordance with an embodiment, the REST API can then orchestrate asynchronous calls to the underlying microservices 220, 230 to fetch the locale-specific labels for each of the page labels associated with the requested page. The response from each of the underlying microservices is aggregated, and the aggregated labels returned to the user's client application (e.g., browser), so that the page elements can be rendered as a localized user interface in the required localization, e.g., language.

In accordance with an embodiment, aggregated labels can be cached at the system by the centralized REST API with a key indicative of a locale-requested-page; and/or the labels response configured with a time-to-live (TTL), so that it is served from the browser cache.

In accordance with an embodiment, technical advantages of the described approach include the use of a single network call out to the centralized REST API to retrieve the labels from the multiple microservices. Labels can still be individually maintained by the service owning the feature or page element.

In accordance with an embodiment, when caching is used, labels can be resolved once for the release on the server when the first user request comes in. Subsequent requests from other users to the same page will be served from the central cache. When a user revisits a page all its labels are also served from the browser cache; the page labels are only loaded as and when the user visits a particular page.

Example Use Case

Figure 6:
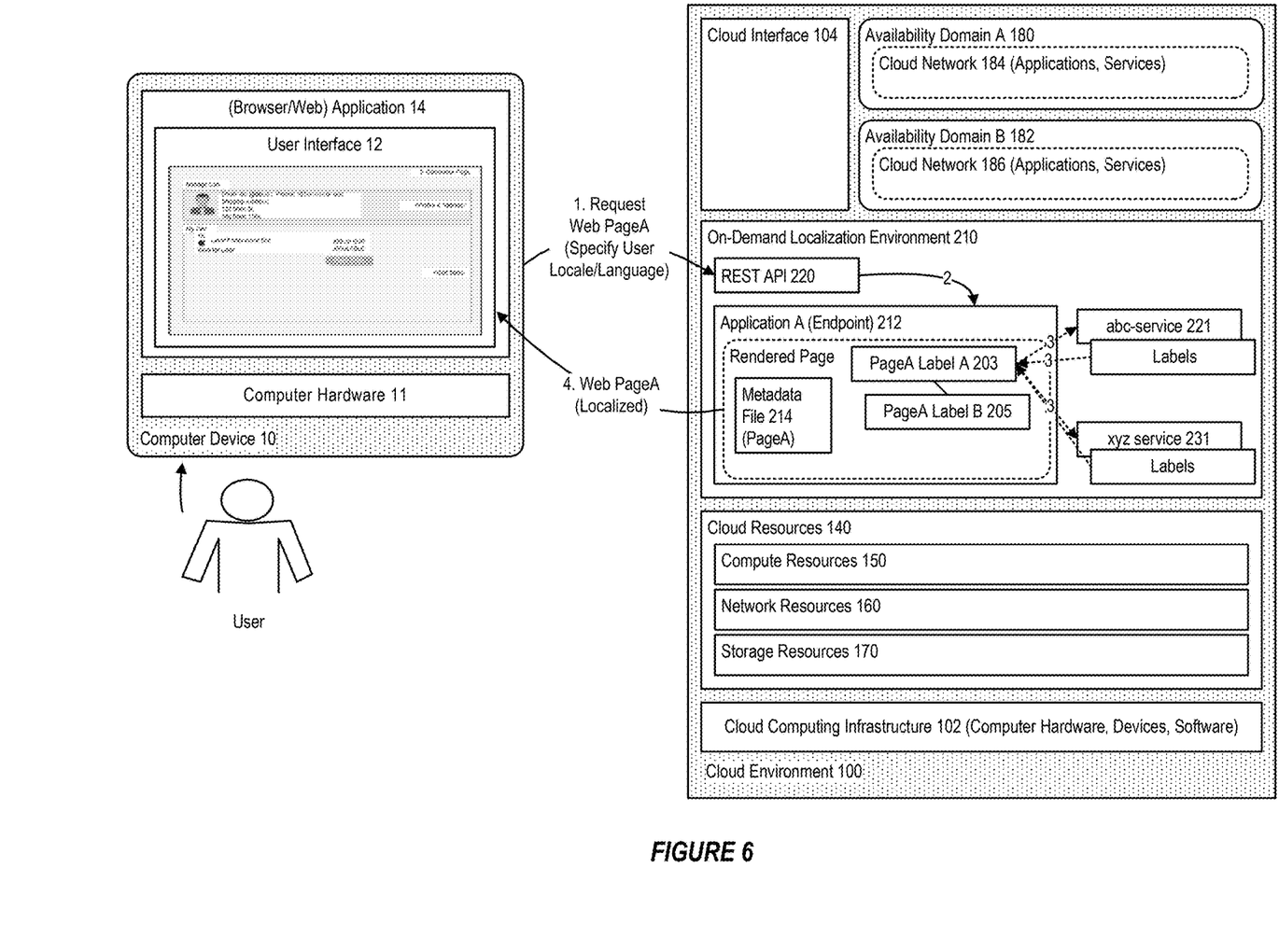
FIG. 6 illustrates an example use of a system for providing on-demand localization with a microservice application, in accordance with an embodiment.

FIG. 6 illustrates an example use of a system for providing on-demand localization with a microservice application, in accordance with an embodiment.

As illustrated in FIG. 6, in accordance with an embodiment, the on-demand localization environment and REST API operate with first (abc-service) microservice 221 and second (xyz-service) microservice 231 to orchestrate asynchronous calls to the underlying microservices to fetch the locale-specific labels for each of a plurality of page labels 203, 205 associated with a requested user interface or page.

In accordance with an embodiment, the process of on-demand localization can include, for example:

1. When the user opens a page (e.g., pageA), the user interface makes a REST API GET call to an endpoint carrying locale information and the requested page's name; such as, for example: /myapp/nls/en/app.flows-.flowA.pages.pageA. The indication of locale or language can either be passed on the URI or within the standard HTTP header "Accept-Language".

2. The REST endpoint maintains a metadata JSON file. This file contains label keys needed by a specific page and from which service to pull localized user interface labels or label values from. For example, the last part of the URI (app.flows.flowA.pages.pageA) denotes JSONpath(/app/flows/flowA/pages/pageA) to be looked up in this metadata file.

In accordance with an embodiment, the metadata can be shaped freely as per the framework someone uses. Since the metadata is structured hierarchically, the system supports configuring labels commonly required by multiple pages/flows at one or more level higher. When a page is requested, the system delivers labels that are configured at page level, as well as include labels configured at all its parent nodes. This helps reduce code duplication maintenance.

```
{
  "app": {
    "flows": {
      "flowA": {
        "pages": {
          "xyz-service": ["common_label_1_key",
          "common_label_2_key"],
          "pageA": {
            "abc-service": [
              "pageA_label_1_key",
              "pageA_label_2_key",
              "pageA_label_3_key"],
            "xyz-service": [
              "pageA_label_4_key",
              "pageA_label_5_key"]
          },
          "pageB" : {
            "xyz-service": [
              "pageB_label_1_key",
              "pageB_label_2_key"]
          }
        }
      }
    }
  }
}
```

```
    }
  }
}
```

3. Once a matching JSON node is identified for the requested page, then the system can delegate, e.g., JSON: API calls, or if needed an external web service call, to the underlying systems, passing on the user's locale and the configured label keys. These calls can be invoked in parallel as they are not dependent on each other. After receiving the resolved labels, the system can aggregate them, for example as a single JSON response. The aggregated response can also be cached to make them reusable for multiple users.

4. An aggregated response can then be sent back to the client application, e.g., browser, which can be cached by the client application, e.g., browser, and used to render the localized user interface.

Figure 7:
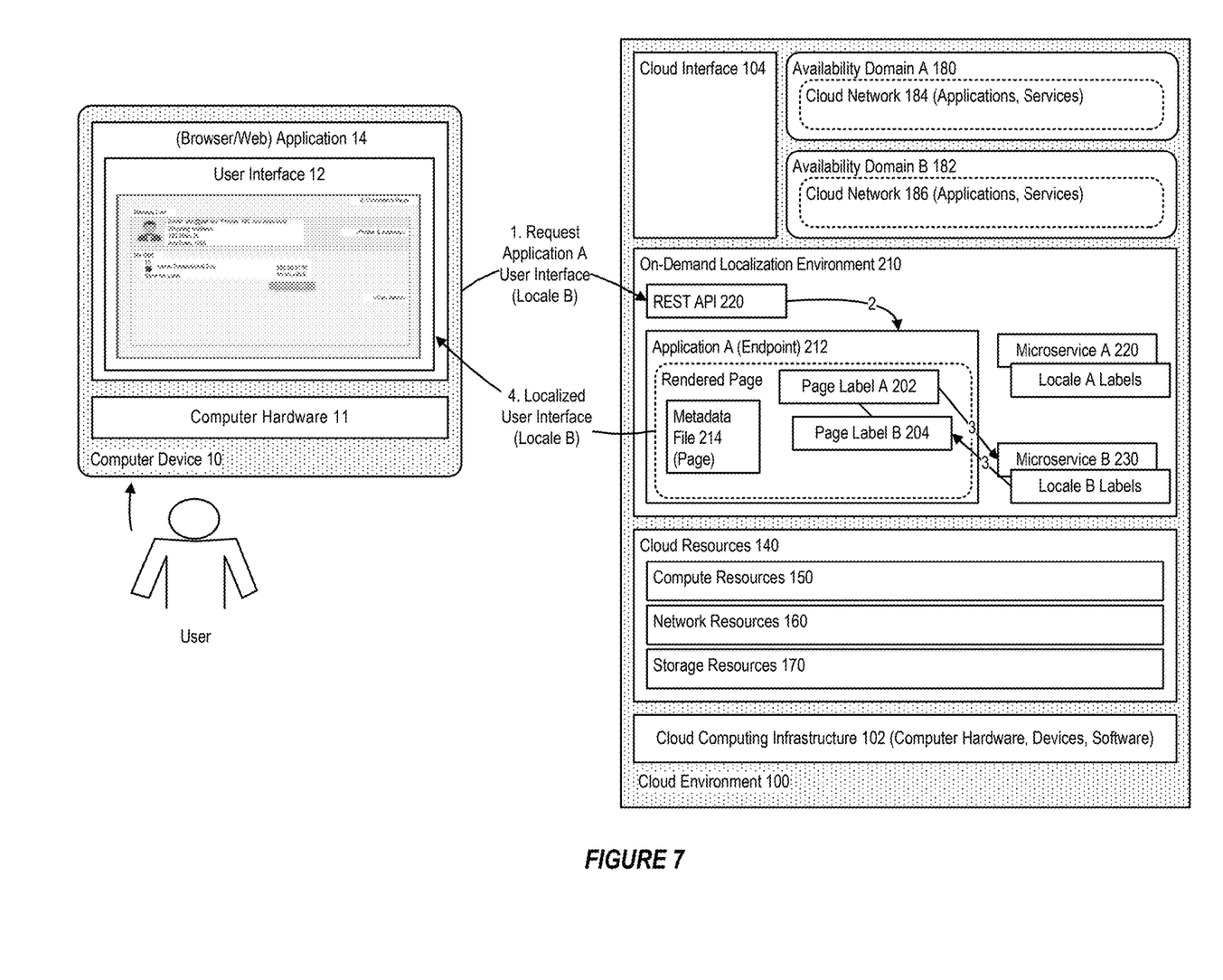
FIG. 7 further illustrates a system for providing on-demand localization with a microservice application, in accordance with an embodiment.

FIG. 7 further illustrates a system for providing on-demand localization with a microservice application, in accordance with an embodiment.

As illustrated in FIG. 7, in accordance with an embodiment, when the application is accessed from a different locale, the REST API operates to receive a request at an endpoint associated with a different (B) locale, e.g., language, identification; and the currently-requested or visited page; and can use the locale or language and page information to review its internally-configured JSON metadata file for the requested page, and fetch the locale-specific labels for each of the page labels associated with the requested page, so that the page elements can be rendered as a localized user interface in the required localization, e.g., language.

Figure 8:
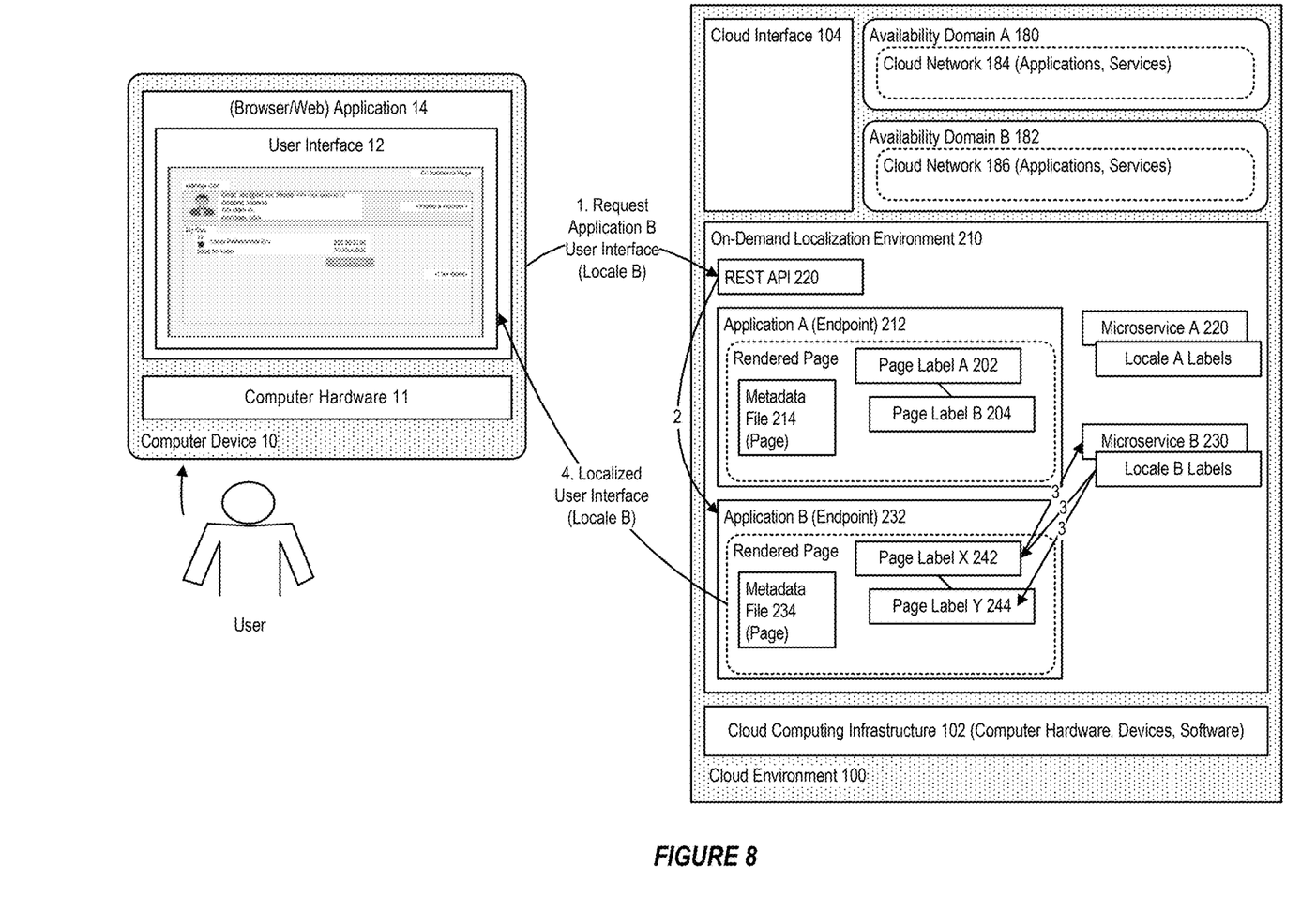
FIG. 8 further illustrates a system for providing on-demand localization with a microservice application, in accordance with an embodiment.

FIG. 8 further illustrates a system for providing on-demand localization with a microservice application, in accordance with an embodiment.

As illustrated in FIG. 8, in accordance with an embodiment, the REST API can similarly operate to receive a request at another application endpoint 232 associated with an application's user interface or page that includes a locale, e.g., language, identification and requested/visited page information, and render the page in the appropriate localization, e.g., language, using the above-described approach.

Figure 9:
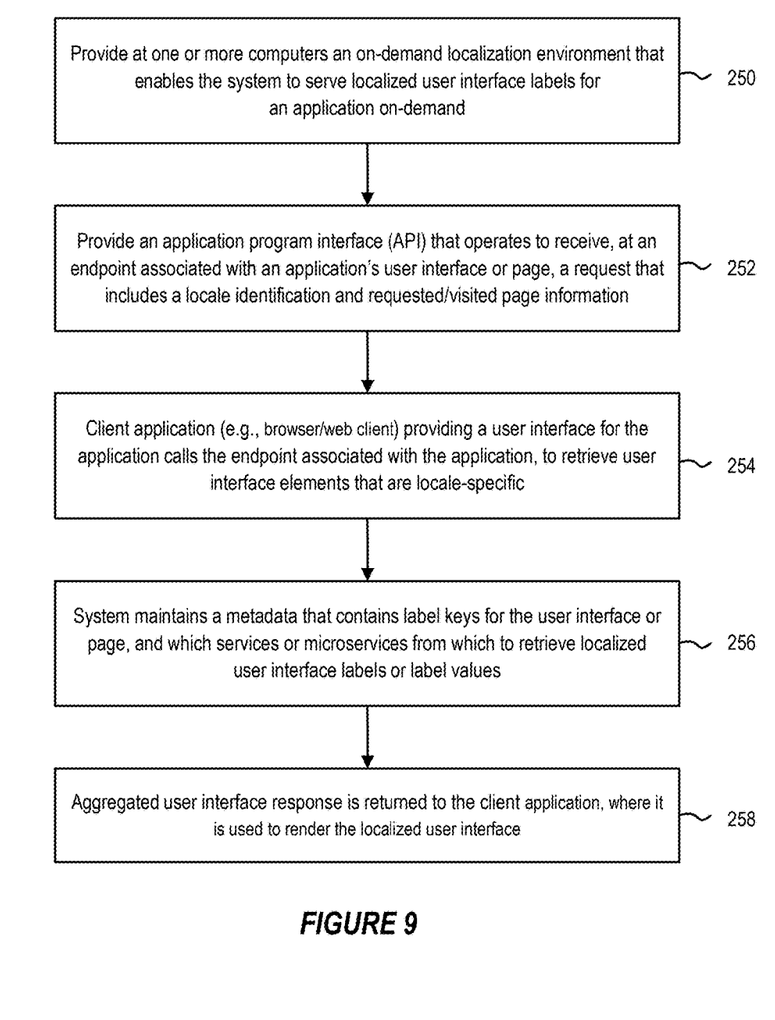
FIG. 9 illustrates a process or method for providing on-demand localization with a microservice application, in accordance with an embodiment.

FIG. 9 illustrates a process or method for providing on-demand localization with a microservice application, in accordance with an embodiment.

As illustrated in FIG. 9, in accordance with an embodiment, the method can include, at step 250, providing at one or more computers an on-demand localization environment that enables the system to serve localized user interface labels for an application on-demand.

At step 252, an application program interface (API) is provided, that operates to receive at an endpoint associated with an application's user interface or page a request that includes a locale identification and requested/visited page information.

At step 254, a client application (e.g., browser/web client) providing a user interface for the application calls the endpoint associated with the application, to retrieve user interface elements that are locale-specific.

At step 256, the system maintains a metadata that contains label keys for the user interface or page, and which services or microservices from which to retrieve localized user interface labels or label values.

At step 258, an aggregated user interface response is returned to the client application, where it is used to render the localized user interface.

Technical Advantages

In accordance with an embodiment, technical advantages of the described approach include the use of a single network call out to the centralized REST API to retrieve the labels from the multiple microservices. Labels can still be individually maintained by the service owning the feature or page element.

In accordance with an embodiment, when caching is used, labels can be resolved once for the release on the server when the first user request comes in. Subsequent requests from other users to the same page will be served from the central cache. When a user revisits a page all its labels are also served from the browser cache; the page labels are only loaded as and when the user visits a particular page.

In accordance with various embodiments, additional technical advantages of the described approach can include, for example:

In accordance with an embodiment, the described approach does not impose any restructuring of an application's existing localization representation. It can be adopted incrementally; and can be adopted for use with legacy applications as well as those starting with new applications.

In accordance with an embodiment, the system can provide support for hierarchical labels, letting the users configure in one place common labels required by multiple pages in the JSON metadata file. Localized resources can be centrally located in the system;

while developers can put together the resource key as metadata and not have to define them again. For example, with an application that uses modules, when serving a parent module the system can serve message resources that are defined for the parent; when serving any of the child modules the system can include the message resources for the parent; since the metadata comprises a message resource key, one can refer to the same key in multiple modules.

In accordance with an embodiment, labels that are needed by a feature or a page can be lazily loaded at runtime.

In accordance with an embodiment, labels can be cached by the browser.

In accordance with an embodiment, in a microservice application environment, a particular system can aggregate labels needed by a page which are been maintained by multiple underlying systems.

In accordance with an embodiment, the described approach enables migration of legacy applications to cloud or other computing environments for which localization may be desired; and supports further development and maintenance of applications while accommodating users in different regions.

In accordance with an embodiment, user interfaces for use with an application can be developed without burdening the client-side by only bringing over what is needed for the client. The described approach can be used with various different types of client devices and client applications, including, for example, personal computer systems, or mobile devices.

In accordance with an embodiment, the described approach can be used to support other types of localization, customization, and/or personalization for particular locales or groups of users, to address various use cases or for use in various computing environments.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMS, EPROMS, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for providing on-demand localization in a microservice application environment, comprising:
one or more computers providing an on-demand localization environment that enables the system to serve localized user interface labels for an application on-demand;
an application program interface (API) that operates to receive at an endpoint associated with an application's user interface or page, a request that includes a locale identification and requested/visited page information;
wherein a client application providing a user interface for the application calls the endpoint associated with the application, to retrieve user interface elements that are locale-specific;
wherein the API maintains a metadata that contains label keys for the user interface or page, and which services or microservices from which to retrieve localized user interface labels or label values, wherein the metadata is arranged in a hierarchical structure, the label keys being arranged within the hierarchical structure such that a set of the label keys are located within the hierarchical structure at one or more level higher level than the remainder of the label keys, the set of the label keys being commonly required by multiple pages;
wherein, based upon the metadata that contains label keys for the user interface or page, and which services or microservices from which to retrieve localized user interface labels or label values, the API orchestrates a plurality of asynchronous calls, each of the plurality of asynchronous calls being directed to, respectively, a microservice of a plurality of underlying microservices based upon the metadata maintained by the API, each of the plurality of asynchronous calls fetching locale-specific labels from each of the plurality of underlying microservices corresponding to page labels associated with the requested page, each of the plurality of underlying microservices maintaining, respectively, the fetched locale-specific labels;
wherein responses from each of the underlying microservices is aggregated, and the aggregated labels returned to the client application, so that the page elements can be rendered in a required localization or language;
wherein an aggregated user interface response, comprising the aggregated labels, is returned to the client application; and
wherein the aggregated labels are additionally stored by the API together with a key indicative of the locale identification for use in serving subsequent requests from a same locale.

2. The system of claim 1, wherein the user interface for the application includes one or more page elements, each of which page elements can be associated with a page label for use by the on-demand localization environment.

3. The system of claim 1, wherein the API uses the locale and page information to review a metadata file for the requested page, wherein the metadata file provides a configuration indicating which label keys are needed by the requested page, and which internal microservice to retrieve those labels from, in a corresponding localization required by the user.

4. The system of claim 1, wherein the metadata file provides a configuration indicating which label keys are needed by the requested page, and which internal microservice to retrieve those labels from, in the corresponding localization required by the user.

5. The system of claim 1,
wherein upon another client application providing the user interface for the application calls the endpoint associated with the application, to retrieve user interface elements that are specific to the same locale, another aggregated user interface response is returned to the another client application, the another aggregated user interface response being based upon the aggregated labels stored by the API.

6. The system of claim 1,
wherein the client application providing the user interface for the application makes only a single call to the endpoint associated with the application to retrieve all user interface elements that are locale-specific; and
wherein the aggregated user interface is returned in response to the single call from the client application, wherein the aggregated user interface comprises all required locale-specific labels which ensures that all required that all required page elements can be rendered in a required localization or language without a further call from the client application.

7. The system of claim 1,
wherein the metadata arranged in the hierarchical structure maintained by the API is arranged in a hierarchical structure with a same format as a hierarchical structure as the requested paged.

8. A method for providing on-demand localization in a microservice application environment, comprising:
providing at one or more computers an on-demand localization environment that enables the system to serve localized user interface labels for an application on-demand;
providing application program interface (API) that operates to receive at an endpoint associated with an application's user interface or page, a request that includes a locale identification and requested/visited page information;

wherein a client application providing a user interface for the application calls the endpoint associated with the application, to retrieve user interface elements that are locale-specific;

wherein the system maintains a metadata that contains label keys for the user interface or page, and which services or microservices from which to retrieve localized user interface labels or label values, wherein the metadata is arranged in a hierarchical structure, the label keys being arranged within the hierarchical structure such that label keys commonly required by multiple pages are at one or more level higher level within the hierarchical structure;

wherein, based upon the metadata that contains label keys for the user interface or page, and which services or microservices from which to retrieve localized user interface labels or label values, the API orchestrates a plurality of asynchronous calls, each of the plurality of asynchronous calls being directed to, respectively, a microservice of a plurality of underlying microservices based upon the metadata maintained by the API, each of the plurality of asynchronous calls fetching locale-specific labels from each of the plurality of underlying microservices corresponding to page labels associated with the requested page, each of the plurality of underlying microservices maintaining, respectively, the fetched locale-specific labels;

wherein responses from each of the underlying microservices is aggregated, and the aggregated labels returned to the client application, so that the page elements can be rendered in a required localization or language;

wherein an aggregated user interface response, comprising the aggregated labels, is returned to the client application; and wherein the aggregated labels are additionally stored by the API together with a key indicative of the locale identification for use in serving subsequent requests from a same locale.

9. The method of claim 8, wherein the user interface for the application includes one or more page elements, each of which page elements can be associated with a page label for use by the on-demand localization environment.

10. The method of claim 8, wherein the API uses the locale and page information to review a metadata file for the requested page, wherein the metadata file provides a configuration indicating which label keys are needed by the requested page, and which internal microservice to retrieve those labels from, in a corresponding localization required by the user.

11. The method of claim 8, wherein the metadata file provides a configuration indicating which label keys are needed by the requested page, and which internal microservice to retrieve those labels from, in the corresponding localization required by the user.

12. The method of claim 8,
wherein upon another client application providing the user interface for the application calls the endpoint associated with the application, to retrieve user interface elements that are specific to the same locale, another aggregated user interface response is returned to the another client application, the another aggregated user interface response being based upon the aggregated labels stored by the API.

13. The method of claim 8,
wherein the client application providing the user interface for the application makes only a single call to the endpoint associated with the application to retrieve all user interface elements that are locale-specific; and wherein the aggregated user interface is returned in response to the single call from the client application, wherein the aggregated user interface comprises all required locale-specific labels which ensures that all required that all required page elements can be rendered in a required localization or language without a further call from the client application.

14. A non-transitory computer readable storage medium having instructions thereon, which when read and executed by a computer including one or more processors cause the computer to perform a method comprising:

providing an on-demand localization environment that enables the system to serve localized user interface labels for an application on-demand;

providing an application program interface (API) that operates to receive at an endpoint associated with an application's user interface or page, a request that includes a locale identification and requested/visited page information;

wherein a client application providing a user interface for the application calls the endpoint associated with the application, to retrieve user interface elements that are locale-specific;

wherein the system maintains a metadata that contains label keys for the user interface or page, and which services or microservices from which to retrieve localized user interface labels or label values, wherein the metadata is arranged in a hierarchical structure, the label keys being arranged within the hierarchical structure such that label keys commonly required by multiple pages are at one or more level higher level within the hierarchical structure;

wherein, based upon the metadata that contains label keys for the user interface or page, and which services or microservices from which to retrieve localized user interface labels or label values, the API orchestrates a plurality of asynchronous calls, each of the plurality of asynchronous calls being directed to, respectively, a microservice of a plurality of underlying microservices based upon the metadata maintained by the API, each of the plurality of asynchronous calls fetching locale-specific labels from each of the plurality of underlying microservices corresponding to page labels associated with the requested page, each of the plurality of underlying microservices maintaining, respectively, the fetched locale-specific labels;

wherein responses from each of the underlying microservices is aggregated, and the aggregated labels returned to the client application, so that the page elements can be rendered in a required localization or language;

wherein an aggregated user interface response, comprising the aggregated labels, is returned to the client application; and wherein the aggregated labels are additionally stored by the API together with a key indicative of the locale identification for use in serving subsequent requests from a same locale.

15. The non-transitory computer readable storage medium of claim 14, wherein the user interface for the application includes one or more page elements, each of which page elements can be associated with a page label for use by the on-demand localization environment.

16. The non-transitory computer readable storage medium of claim 14, wherein the API uses the locale and page information to review a metadata file for the requested page, wherein the metadata file provides a configuration indicating which label keys are needed by the requested page, and which internal microservice to retrieve those labels from, in a corresponding localization required by the user.

17. The non-transitory computer readable storage medium of claim 14, wherein the metadata file provides a configuration indicating which label keys are needed by the requested page, and which internal microservice to retrieve those labels from, in the corresponding localization required by the user.

18. The non-transitory computer readable storage medium of claim 14,
   wherein upon another client application providing the user interface for the application calls the endpoint associated with the application, to retrieve user interface elements that are specific to the same locale, another aggregated user interface response is returned to the another client application, the another aggregated user interface response being based upon the aggregated labels stored by the API.

* * * * *